(12) United States Patent
Takeuchi (10) Patent No.: US 8,619,346 B2
(45) Date of Patent: Dec. 31, 2013

(54) IMAGE READING APPARATUS

(75) Inventor: Masaru Takeuchi, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 213 days.

(21) Appl. No.: 13/245,186

(22) Filed: Sep. 26, 2011

(65) Prior Publication Data

US 2012/0081765 A1 Apr. 5, 2012

(30) Foreign Application Priority Data

Sep. 30, 2010 (JP) ................................ 2010-220499

(51) Int. Cl.
*H04N 1/04* (2006.01)
*G03G 15/20* (2006.01)
*G03G 15/00* (2006.01)
*B21D 21/00* (2006.01)
*B65H 5/22* (2006.01)

(52) U.S. Cl.
USPC ............. 358/498; 358/496; 399/374; 399/69; 29/33 Q; 271/3.03

(58) Field of Classification Search
USPC ............. 358/498, 496; 399/374, 69; 29/33 Q; 271/3.03
See application file for complete search history.

(56) References Cited

U.S. PATENT DOCUMENTS

| | | | |
|---|---|---|---|
| 4,975,749 A * | 12/1990 | Tsunoda et al. | 399/374 |
| 4,979,727 A * | 12/1990 | Koike et al. | 271/3.03 |
| 5,251,366 A * | 10/1993 | Reil et al. | 29/33 Q |
| 6,145,834 A | 11/2000 | Hirota et al. | |
| 7,570,400 B2 * | 8/2009 | Ito et al. | 358/498 |
| 2004/0178571 A1 | 9/2004 | Ohama et al. | |
| 2006/0098250 A1 * | 5/2006 | Ito et al. | 358/498 |
| 2006/0285902 A1 * | 12/2006 | Horaguchi | 399/374 |
| 2007/0047027 A1 * | 3/2007 | Yamamoto | 358/496 |
| 2007/0070452 A1 * | 3/2007 | Ando | 358/498 |
| 2011/0064439 A1 * | 3/2011 | Suzuki | 399/69 |

FOREIGN PATENT DOCUMENTS

| | | |
|---|---|---|
| JP | 11-005659 | 1/1999 |
| JP | 2002278174 A | 9/2002 |
| JP | 2003261242 A | 9/2003 |
| JP | 2004064607 A | 2/2004 |
| JP | 2004-277089 | 10/2004 |
| JP | 2006139030 A | 6/2006 |

OTHER PUBLICATIONS

JP Office Action mailed May 28, 2013, JP Appln. 2010-220499, English Translation.
JP Notification of Reasons for Rejection, in corresponding JP Applicaiton No. 2010-220499 dated Dec. 18, 2012. English Translation.

* cited by examiner

*Primary Examiner* — Charlotte M Baker
*Assistant Examiner* — Rury Grisham
(74) *Attorney, Agent, or Firm* — Banner & Witcoff, Ltd.

(57) ABSTRACT

An image reading apparatus including a main unit and an openable unit is provided. One of an upper-stream section and a lower-stream section in a sheet path with respect to a U-curved section is provided as an upper-level path, and the other of the upper-stream section and the lower-stream section is arranged in a lower-level path. The openable unit includes a movable piece arranged in a position along the lower-level path and is swingable to be close to and separated apart from the lower-level path. The movable piece is movable by its own weight from a closed position to an open position when the openable unit is moved to an open position. The movable piece serves as a part of a bottom surface of the lower-level path when in the closed position and exposes a part of the lower-level path when in the open position.

7 Claims, 8 Drawing Sheets

FIG. 8B

IMAGE READING APPARATUS

CROSS REFERENCE TO RELATED APPLICATION

This application claims priority from Japanese Patent Application No. 2010-220499, filed on Sep. 30, 2010, the entire subject matter of which is incorporated herein by reference.

BACKGROUND

1. Technical Field

An aspect of the present invention relates to an image reading apparatus.

2. Related Art

An image reading apparatus with an automatic document feeder (ADF) to feed a sheet of original document in the image reading apparatus is known. In the image reading apparatus, a document path to convey the document sheet therealong may be provided, and the document sheet flows in a predetermined conveying direction along the document path. The document path may have a U-curved winding section, at which the document sheet is turned around to be directed inward.

In the image reading apparatus, an upper-stream section and a lower-stream section of the document path with respect to the U-curved section may be formed in vertically different levels. That is, one of the upper-stream section and the lower-stream section may be formed in an upper position with respect to the other of the upper-stream section and the lower-stream section, and the upper-stream section and the lower-stream section may be connected with each other via the U-curved section.

SUMMARY

The one of the upper-stream and lower-stream sections in the document path in the upper position (hereinafter, the "upper-level section") may be covered by a top cover, and when the top cover is removed, the upper-level section of the document path may be exposed rather easily. Therefore, when sheet jam occurs in the upper-level section, a user may open the top cover to expose the upper-level section of the document path and remove the jammed sheet to clear the sheet jam.

Meanwhile, sheet jam may also occur in a lower-level section, which is the other of the upper-stream and lower-stream sections in the document path arranged in the lower position with respect to the U-curved section. The lower-level section may be interfered with by neighboring components, which are parts of the upper-level section of the document path, and may not be exposed easily to be accessed by the user. Therefore, the sheet jam occurred in the lower-level section may not easily be cleared.

In view of the difficulty, the present invention is advantageous in that an image reading apparatus with a sheet path, in which the sheet jammed in the lower-level section can be removed rather easily, is provided whilst the sheet path includes a vertically overlapping upper-level section and a lower-level section.

According to an aspect of the present invention, an image reading apparatus to read an image formed on a sheet is provided. The image reading apparatus includes a main unit having a flat surface, on which the sheet with the image to be read can be placed, and an image reader, which is configured to be moved along the flat surface to read the image from the sheet, and an openable unit, which is configured to be movable between an open position and a closed position with respect to the main unit and cover the flat surface when in the closed position. The openable unit includes a sheet tray, in which the sheet with the image to be read can be set, a conveyer section, which is configured to convey the sheet from the sheet tray along a sheet path, and a discharge section, in which the sheet having been conveyed by the conveyer section is discharged. The image reader is configured to read the image formed on the sheet being conveyed by the conveyer section in a predetermined reading position. The sheet path includes a U-curved section, along which the sheet being conveyed is turned around, an upper-level path, which is in an upper position within the sheet path, and a lower-level path, which is in a lower position with respect to the upper-level path within the sheet path. The conveyer section comprises the U-curved section in the sheet path. The sheet path further includes an upper-stream section, which ranges from the sheet tray to the U-curved section, and a lower-stream section, which ranges from the U-curved section to the discharge section. One of the upper-stream section and the lower-stream section is provided as the upper-level path, and the other of the upper-stream section and the lower-stream section is provided as the lower-level path. The image formed on the sheet is read by the image reader in the predetermined reading position whilst the sheet being conveyed in the lower level path passes through a position to face the image reader. The openable unit is provided with a movable piece, which is arranged in a position along the lower-level path and is swingable about a first edge thereof being an edge further from the U-curved section of the sheet path to swing a second edge thereof being an edge closer to the U-curved section to be close to and separated apart from the lower-level path. The movable piece is movable by its own weight from a closed position, in which the second edge of the movable piece is closest to the lower-level path, to an open position in which the second edge of the movable piece is furthest from the lower-level path, when the openable unit is moved to the open position. The movable piece serves as a part of a bottom surface of the lower-level path when in the closed position and exposes a part of the lower-level path when in the open position.

DETAILED DESCRIPTION

Hereinafter, embodiments of the present invention will be described with reference to the accompanying drawings. A multifunction peripheral device (MFP) 1 will represent an image reading device according to the present invention.

Overall Configuration of the MFP

Figure 1A:
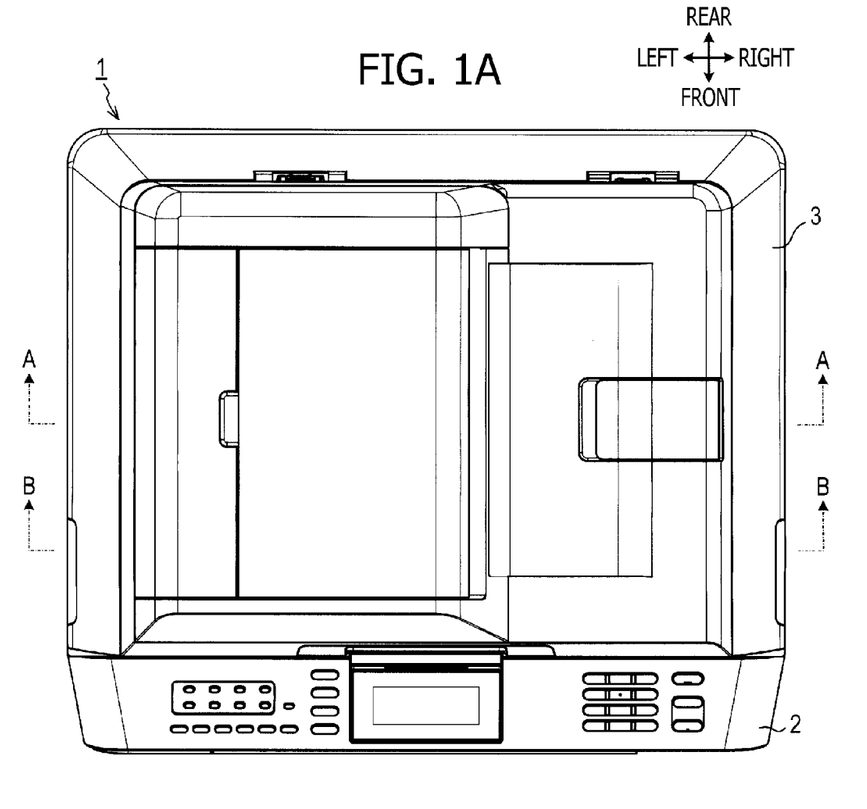
FIG. 1A is a top plane view of a multifunction peripheral (MFP) having an image reading apparatus according to an embodiment of the present invention.
Figure 1B:
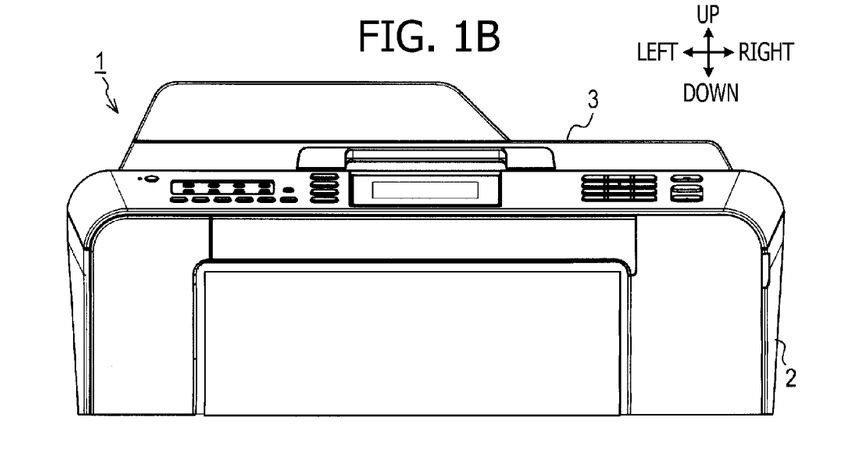
FIG. 1B is a front-side view of the MFP according to the embodiment of the present invention.
Figure 2A:
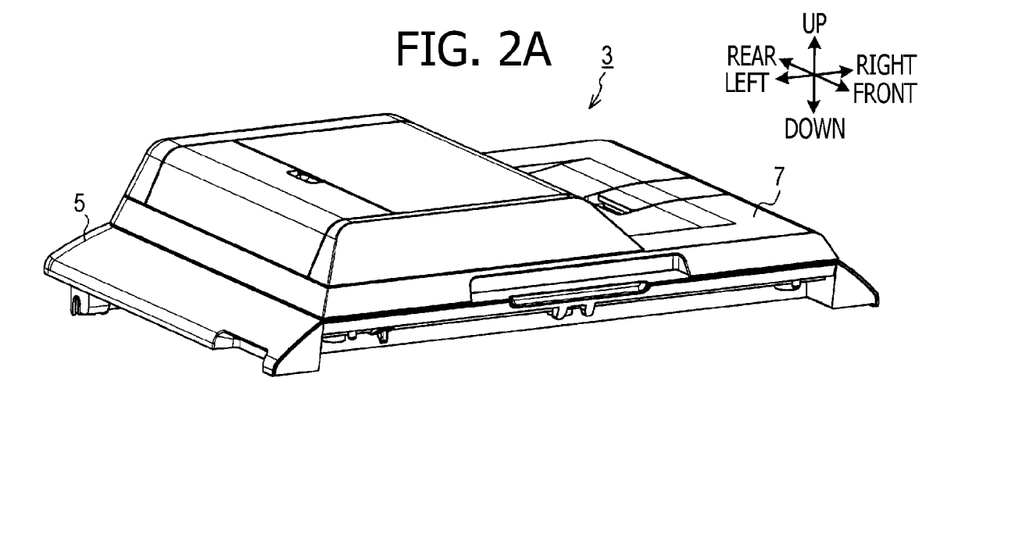
FIG. 2A is a perspective view of a scanner unit with an ADF in a closed position in the MFP according to the embodiment of the present invention.
Figure 2B:
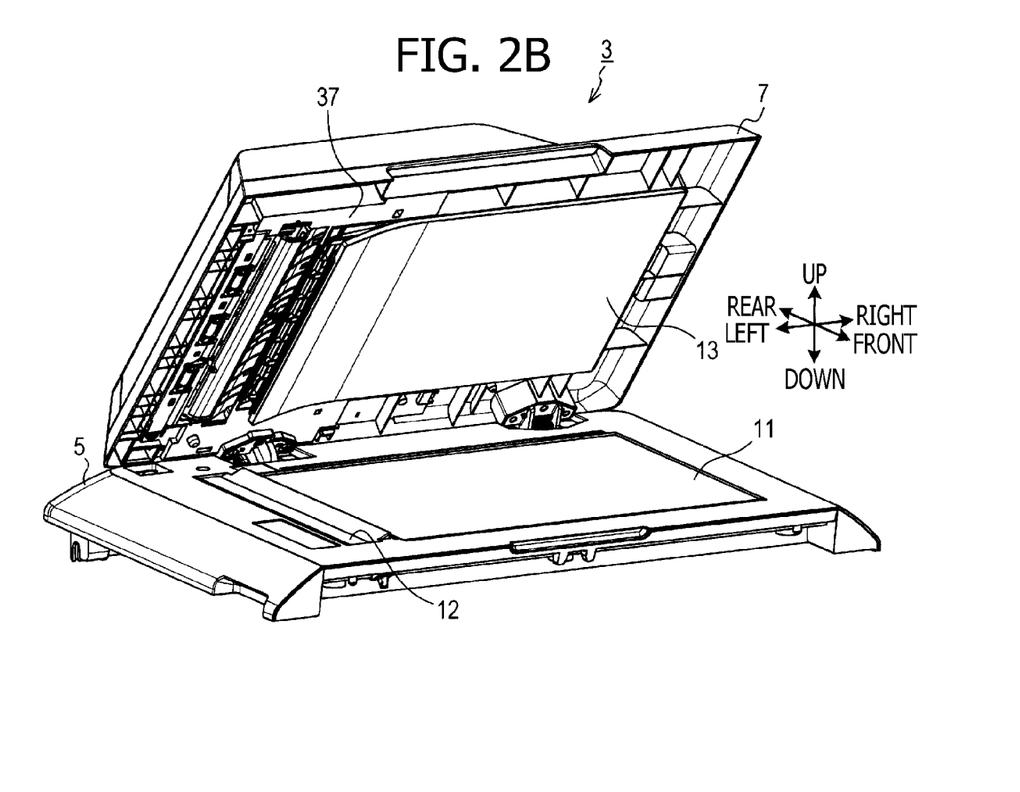
FIG. 2B is a perspective view of the scanner unit with the ADF in an open position in the MFP according to the embodiment of the present invention.

An overall configuration of the MFP 1 will be described with reference to FIGS. 1-2. The MFP 1 is equipped with a plurality of image processing functions, which include scanning, printing, copying, and facsimile receiving/transmission. In the present embodiment, directions concerning the MFP 1 will be referred to in accordance with orientation indicated by arrows in the drawings.

The MFP 1 includes a main unit 2 at a bottom and a scanner unit 3 on top of the main unit 2. The scanner unit 3 is pivotable about a lower rear edge thereof, which corresponds to an upper rear edge of the main unit 2, to be openable and closable with respect to the main unit 2. Thus, the scanner unit 3 can shift postures thereof between a closed position (see FIG. 1B) and an open position (not shown). When the scanner unit 3 is in the closed position, a top opening of the main unit 2 is covered by the scanner unit 3.

The scanner unit 3 in the present embodiment is a flatbed image scanner with an ADF. More specifically, the scanner unit 3 includes a flatbed main scanning unit 5, on which a sheet of source document with an original image to be read can be set, in a lower position and an ADF 7, which covers a top of the flatbed main scanning unit 5, in an upper position.

The ADF 7 is pivotable about a rear edge thereof and can shift postures thereof between a closed position (see FIG. 2A) and an open position (see FIG. 2B) to be closable and openable with respect to the flatbed main scanning unit 5 when a front part thereof is lowered and uplifted. When the ADF 7 is in the closed position, a top surface of the flatbed main scanning unit 5 is covered by the ADF 7. Further, when the ADF 7 is in the open position, the sheet of original document can be placed in a position between the flatbed main scanning unit 5 and the ADF 7.

The flatbed main scanning unit 5 is provided with a piece of flatbed glass 11 and a piece of ADF glass 12 on a top surface thereof. Meanwhile, on a lower surface of the ADF 7, in a position to face the flatbed glass 11 when the ADF 7 is in the closed position, a presser member 13 is arranged.

The presser member 13 is a sheet including two laminated layers, which are an upper sponge layer and a lower white-colored plastic-film layer. When the ADF 7 is in the closed position, the presser member 13 is interposed between remaining of the ADF 7 and the flatbed glass 11 in the flatbed main scanning unit 5. More specifically, when the ADF 7 is in the closed position, the sponge layer is interposed between the remaining of the ADF 7 and the plastic-film layer, and the plastic-film layer is interposed between the sponge layer and the flatbed glass 11. In this position, the sponge layer in the presser member 13 is resiliently compressed, and the plastic-film layer is pressed against the flatbed glass 11 by the resiliency of the sponge.

Detailed Description of Scanner Unit

The scanner unit 3 will be described hereinbelow in detail with reference to FIGS. 3-6. The scanner unit 3 is equipped with an image sensor 14 (see FIG. 3A), which is a contact image sensor (CIS), in the flatbed main scanning unit 5. The image sensor 14 is mounted on a carriage 15, which is reciprocated in a position below the ADF glass 12 in the flatbed main scanning unit 5 along a right-left direction.

The ADF 7 is equipped with conveyer components including a plurality of rollers, which include a feed roller 21, a separator roller 22, a main conveyer roller 23, and a discharge roller 24. These rollers 21-24 are driven by driving force from a drive source (not shown). The rollers 21-24 nip a sheet of original document (not shown) in cooperation with pinch rollers, which include a first pinch roller 26, a second pinch roller 27, and a third pinch roller 28. These rollers 21-28 consist of a sheet path, in which the sheet of original document placed on a document tray 31 is conveyed toward a discharge section 32. The sheet path is indicated in a dotted line in FIG. 3A.

In the ADF 7, in a position above the ADF glass 12 when the ADF 7 is in the closed position, a sheet holder 33 is arranged. When the sheet being conveyed in the sheet path reaches the position above the ADF glass 12, the sheet is pressed toward the ADF glass 12 by the sheet holder 33.

In the sheet path in the ADF 7, along a section between the sheet holder 33 and the discharge roller 24, a movable flip 35 is arranged. The movable flip 35 is swingably attached to a base member 37 of the ADF 7 (see FIG. 4A). In particular, the movable flip 35 is formed to have shafts 41 (see FIG. 4B) at a front end and a rear end thereof along a direction of depth (i.e., front-rear direction of the MFP 1) and in vicinities of a rightward end thereof. Meanwhile, the base member 37 is formed to have bearings 43 (see FIG. 5A).

With the shafts 41 being pivotally supported in the bearings 43, the movable flip 35 is swingable about the shafts 41, and a leftward end portion of the movable flip 35 is movable upwardly and downwardly to be close to and apart from the base member 37.

Figure 3A:
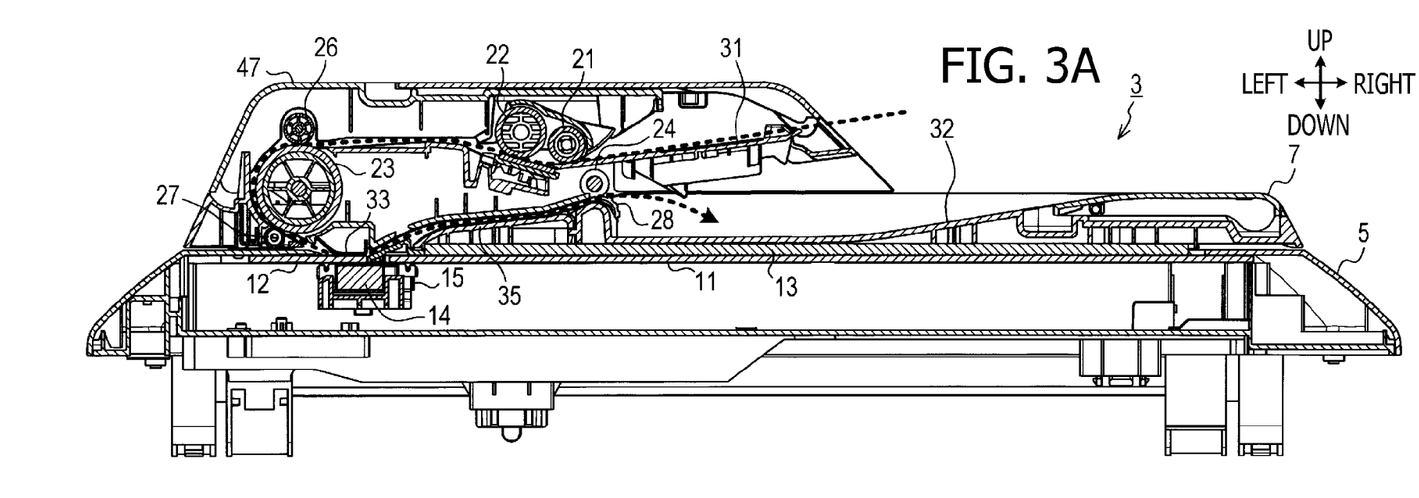
FIG. 3A is a cross-sectional view of the scanner unit with a movable flip being in a closed position taken from a line A-A shown in FIG. 1A.

When the ADF 7 is in the closed position, the movable flip 35 is pressed by the flatbed glass 11 and shifted to a closed position (see FIG. 3A). In the closed position, an upper surface of the movable flip 35 serves as a part of a bottom surface of the lower-level section of the sheet path.

Figure 3B:
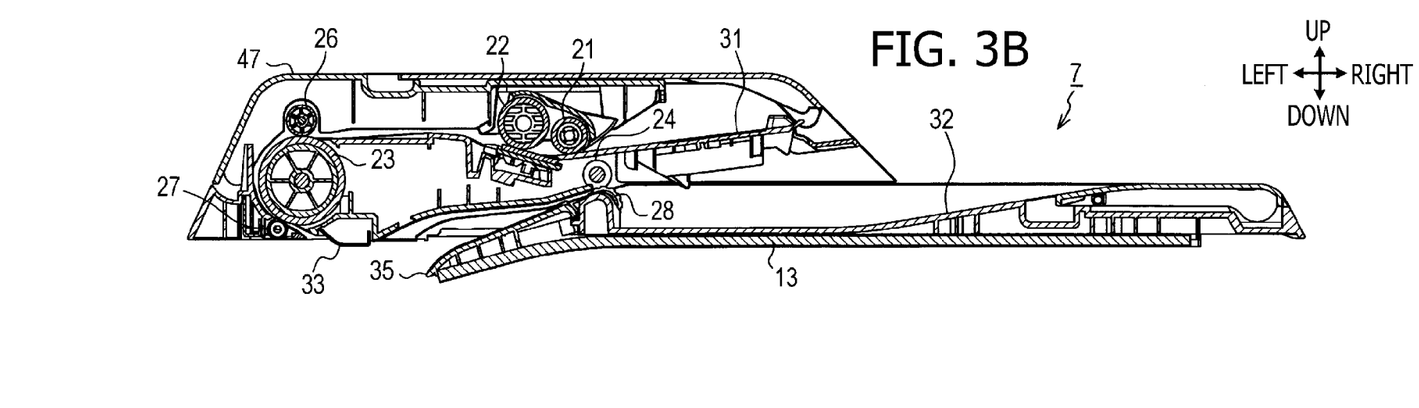
FIG. 3B is a cross-sectional partial view of the scanner unit with the movable flip being in an open position taken from the line A-A shown in FIG. 1A.
Figure 4A:
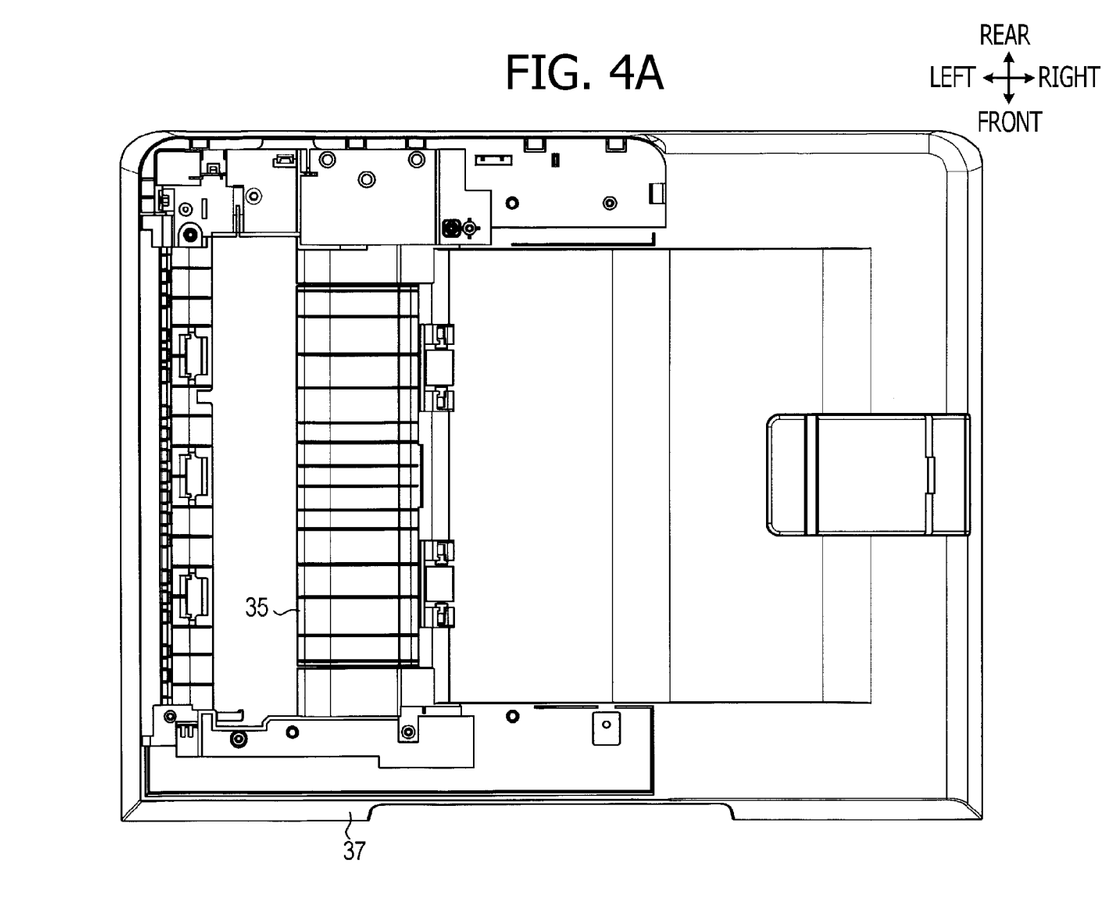
FIG. 4A is a plane view of the ADF with a base member and the movable flip in the MFP according to the embodiment of the present invention.
Figure 4B:
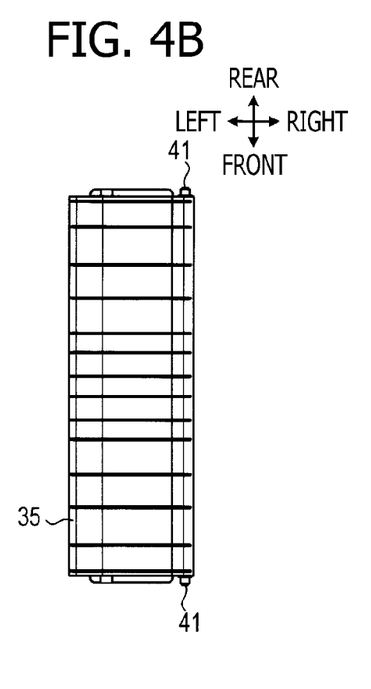
FIG. 4B is a top plane view of the movable flip in the MFP according to the embodiment of the present invention.
Figure 5A:
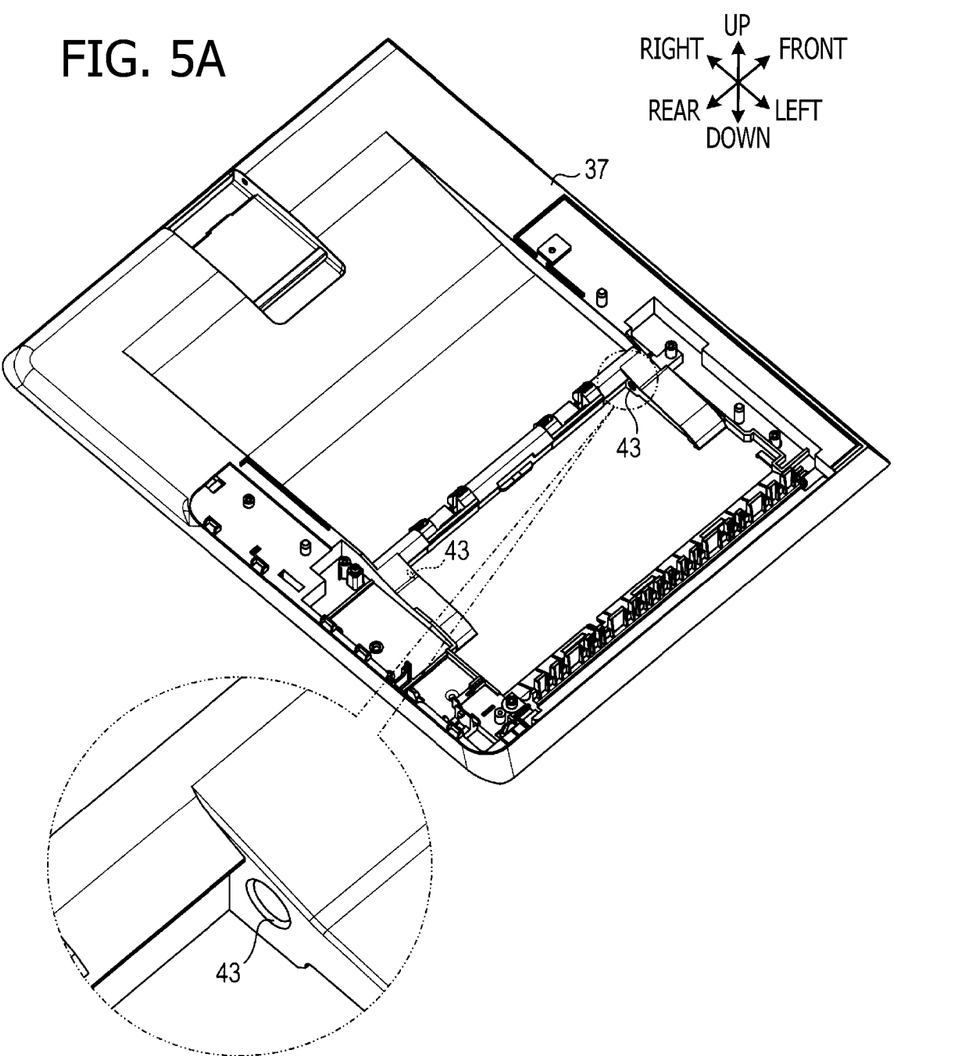
FIG. 5A is a perspective view of the base member in the ADF of the MFP according to the embodiment of the present invention.
Figure 5B:
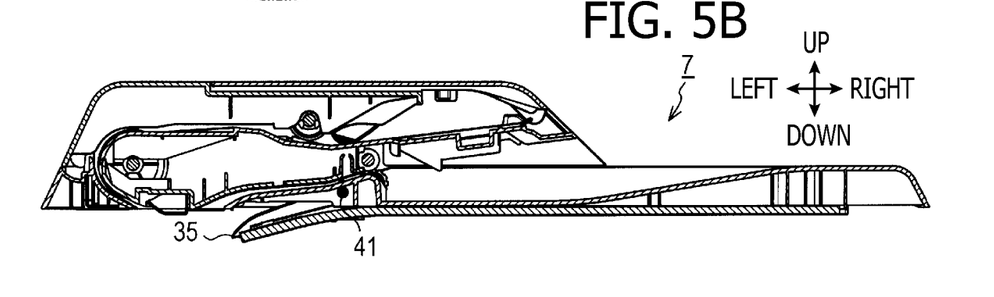
FIG. 5B is a cross-sectional view of the scanner unit taken from a line B-B shown in FIG. 1A.

When the ADF 7 is in the open position, the movable flip 35 is released from the flatbed glass 11 and swings downwardly by its own weight to an open position (see FIG. 3B). When the movable flip 35 shifts to the open position, a part of the presser member 13 attached to the movable flip 35 is resiliently deformed and moved downwardly along with the movable flip 35. When the movable flip 35 swings downwardly, a rightward edge of the movable flip 35 becomes in contact with the base member 37 and is restricted from being moved further.

Figure 6:
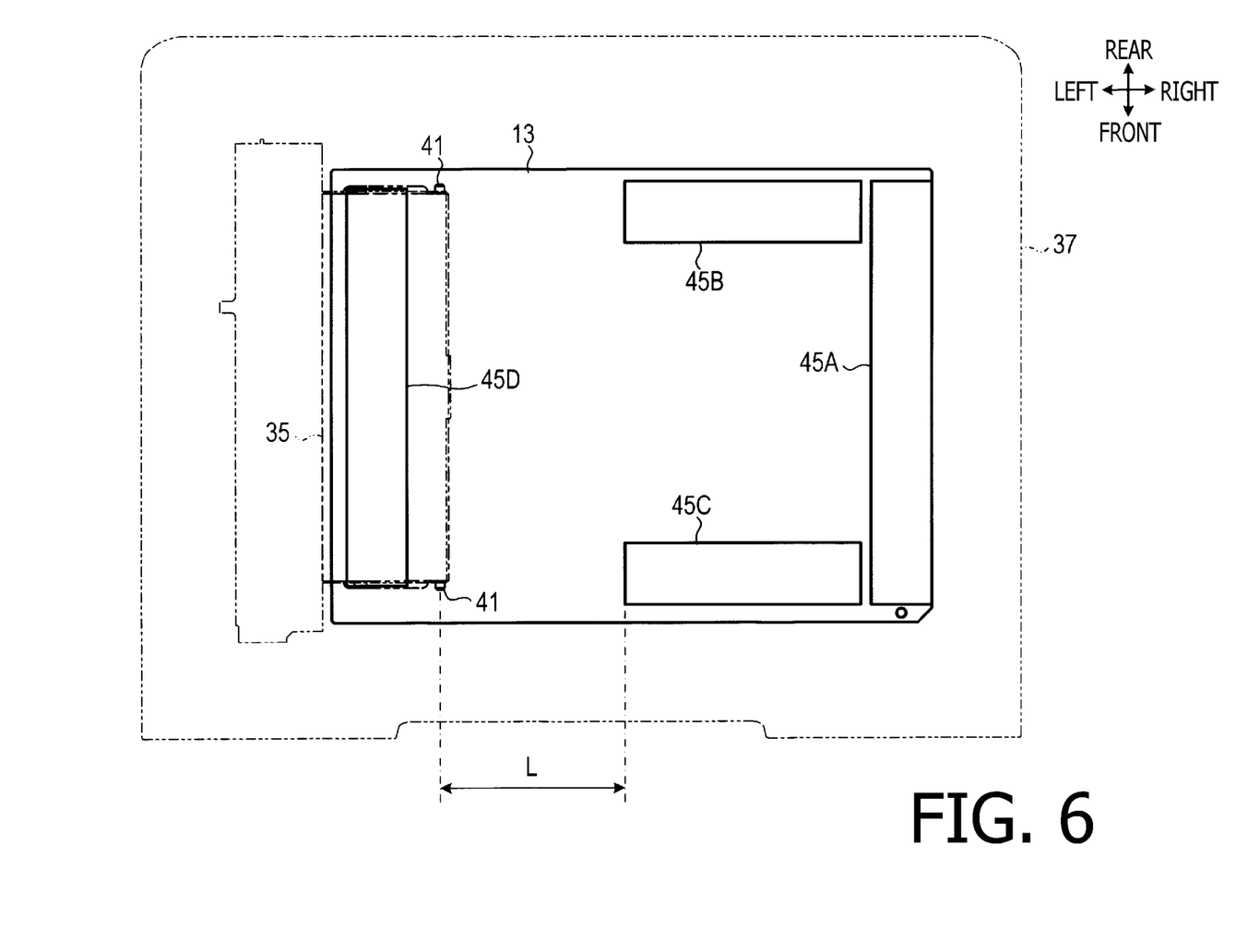
FIG. 6 is a diagram to illustrate positions of a presser member and double-face adhesive tapes in the MFP according to the embodiment of the present invention.

The presser member 13 is attached to a bottom of the base member 37 via a plurality of (e.g., three) pieces of double-face adhesive tapes 45A, 45B, 45C (see FIG. 6). Further, the presser member 13 is attached to a downward surface of the movable flip 35 via a piece of double-face adhesive tape 45D. Specifically, via the adhesive tapes 45B, 45C, the presser member 13 is attached to the base member 37 at positions further from the pivotable leftward edge of the movable flip 35 with respect to portions coincident with the shafts 41 in the ADF 7. The adhesive tapes 45B, 45C are arranged in positions to be apart from the shafts 41 of the movable flip 35 for a length L. With the clearance between the adhesive tapes 45B, 45C and the movable flip 35, the presser member 13 is deformable within the range of the length L to absorb the displacement of the movable flip 35; therefore, the movable flip 35 is allowed to swing smoothly.

When the scanner unit 3 configured as above is used serve as a flatbed scanner, the ADF 7 is opened, and the sheet of original document is placed on top of the flatbed glass 11. In this regard, the movable flip 35 shifts to the open position by its own weight. Further, a leftward edge of the presser member 13 is deformed to be separated from the base member 37 (see FIG. 2B).

When the original document is set on the flatbed glass 11, and the ADF 7 is moved to the closed position, the leftward edge being a lowermost portion of the presser member 13 comes in contact with the original document. Thereafter, until the ADF 7 comes in the fully closed position (see FIG. 2A), the leftward end portion of the presser member 13 maintains the contact with the original document and is pressed against the flatbed glass 11 via the sheet whilst the movable flip 35 is gradually moved from the open position to the closed position.

When the movable flip 35 moves to the closed position, the presser member 13 recovers from the deformed displacement-absorbing condition, and the leftward edge of the presser member 13 is moved slightly leftward. Along with to the recovering behavior of the presser member 13, the sheet of original document is moved leftward toward an origin position, which is defined at a leftward end of the flatbed glass 11. In other words, the sheet may be aligned to the original position with the assistance of the presser member 13. Therefore, even when the sheet of original document is placed in a position separated with respect to the origin position, the sheet may be moved to align the origin position along the flatbed glass 11, and misalignment of the sheet with respect to the origin position may be effectively corrected.

Further, when the ADF 7 is in the fully closed position, the weight of the movable flip 35 affects the sheet of original document. More specifically, the movable flip 35 presses the sheet against the flatbed glass 11. Therefore, the sheet can become in close contact with the flatbed glass 11, and quality of reading the image from the sheet can be improved.

In the scanner unit 3, the ADF 7 being pivotable with respect to the flatbed main scanning unit 5 is additionally movable vertically with respect to the flatbed main scanning unit 5. Therefore, the ADF 7 may be lifted upwardly to allow an original document with substantial thickness (e.g., a book) to be placed correctly between the flatbed main scanning unit 5 and the ADF 7.

When the original document is set in the scanner unit 3, the user may enter an instruction to start an image reading operation in the MFP 1, for example, via an operation panel (unsigned) in the MFP 1 or remotely via a PC. Upon receipt of the instruction, the image sensor 14 is moved along an auxiliary scanning direction underneath the flatbed glass 1 to read a plurality of pixels arranged along a main scanning direction on the sheet of original document sequentially. In the present embodiment, the auxiliary scanning direction refers to a right-left (widthwise) direction, and the main scanning direction refers to the front-rear (depth) direction of the MFP 1.

When the scanner unit 3 is used to serve as an ADF-typed scanner, the sheet of original document is placed on the document tray 31, the user may enter an instruction to start an image reading operation in the MFP 1, for example, via an operation panel (unsigned) in the MFP 1 or remotely via a PC. Upon receipt of the instruction, the image sensor 14 is moved to a position below the ADF glass 12 and stops to settle at a straight below position with respect to the sheet holder 33. Further, the rollers 21-28 are driven to convey the sheet from the document tray 31 in the sheet path (along the dotted line shown in FIG. 3).

More specifically, the sheet on the document tray 31 is picked up by the feed roller 21 and forwarded toward a lower-stream side in the sheet path. In this regard, the sheet is separated from other sheets (not shown) stacked in the document tray 31 and carried one-by-one by the separator roller 22. The separated sheet is further carried to the main conveyer roller 23 and turned in U-curvature around a part of an outer periphery of the main conveyer roller 23. In this regard, the components surrounding the part of the outer periphery of the main conveyer roller 23 (e.g., the rollers 23, 26, 27) compose the U-curved section in the sheet path. The turned-around sheet is forwarded further by the discharge roller 24 to the discharge section 32 at the most lower-stream side and released from the conveying force of the discharge roller 24 to be settled thereat.

The sheet being carried in the sheet path described above passes between the ADF glass 12 and the sheet holder 33 after turned around at the main conveyer roller 23 and before reaching the discharge roller 24. In the position between the ADF glass 12 and the sheet holder 33, the image on the sheet is read by the image sensor 14 being set at the straight below position with respect to the sheet holder 33. In this regard, a plurality of pixels, which are arranged along the main scanning direction on the sheet being conveyed in the auxiliary scanning direction, are read sequentially.

In the image reading operation as described above, the sheet being conveyed may be jammed in the sheet path. When the sheet is jammed in an upper-level of the sheet path, (e.g., in an upper-stream position with respect to the main conveyer roller 23 in the sheet path), the upper-level path may be exposed by removing a top cover 47 (see FIGS. 3A and 3B). Thus, the user may access the jammed sheet and remove the same out of the sheet path.

On the other hand, when the sheet is jammed in a lower-level of the sheet path (e.g., in a lower-stream position with respect to the main conveyer roller 23 in the sheet path), the user may access the lower-level path if the ADF 7 is uplifted and the movable flip 35 shifts to the open position. Therefore, the jammed sheet can be easily removed from lower-level path.

Thus, the sheet jam, either in the upper-level path or in the lower-level path, can be cleared more easily in the MFP 1 according to the present embodiment than an MFP, which is not equipped with the movable flip 35 in the ADF 7.

Although an example of carrying out the invention has been described, those skilled in the art will appreciate that there are numerous variations and permutations of the image reading apparatus that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

More Examples

Figure 7A:
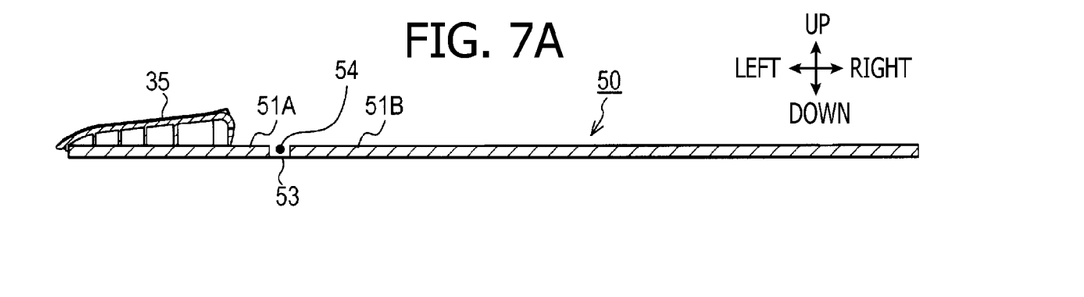
FIG. 7A is a different example of the presser member in the MFP according to an embodiment of the present invention.

For example, the presser member 13 may not necessarily have a single piece of sponge layer but may have a plurality of (e.g., two) pieces of sponge layers 51A, 51B (see FIG. 7A), which are arranged horizontally side-by-side in a presser member 50. The presser member 50 may have a single sheet of white-colored plastic-film layer 53 at the bottom, and two pieces of sponge layers 51A, 51B may be arranged side-by-side with clearance 54 reserved in there-between. With the plurality of pieces of sponge layers 51A, 51B and the clearance 54, the presser member 50 may deform at the clearance 54 more easily by its own weight to move to the open position when the ADF 7 is uplifted.

For another example, the movable flip 35 may not necessarily be configured to move to the open position by its own weight. When the movable flip 35 is not movable by its own weight, for example, materials of the sponge layer and/or the plastic-film layer in the presser member 13, 50 may be modified to provide predetermined degree of resiliency in order for the presser member 13, 50 to serve as a piece of leaf spring.

With the predetermined degree of resiliency, the presser member 13, 50 may hold the movable flip 35 in the closed position even when the ADF 7 is uplifted to be apart from the flatbed glass 11. Meanwhile, when the sheet is jammed in the lower-level path, the user may forcibly move the movable flip 35 by hand to the open position and expose the lower-level path against the resiliency. Thus, the jammed sheet can be removed through the clearance, which is normally covered by the movable flip 35. When the jammed sheet is removed, the user may release the movable flip 35 and let the presser member 13, 50 to move the movable flip 35 to the closed position by its resiliency. Further, the movable flip 35 being movable by its own weight may be combined with the presser member 13, 50 with the resiliency to hold the movable flip 35 at the closed or open position.

Figure 7B:
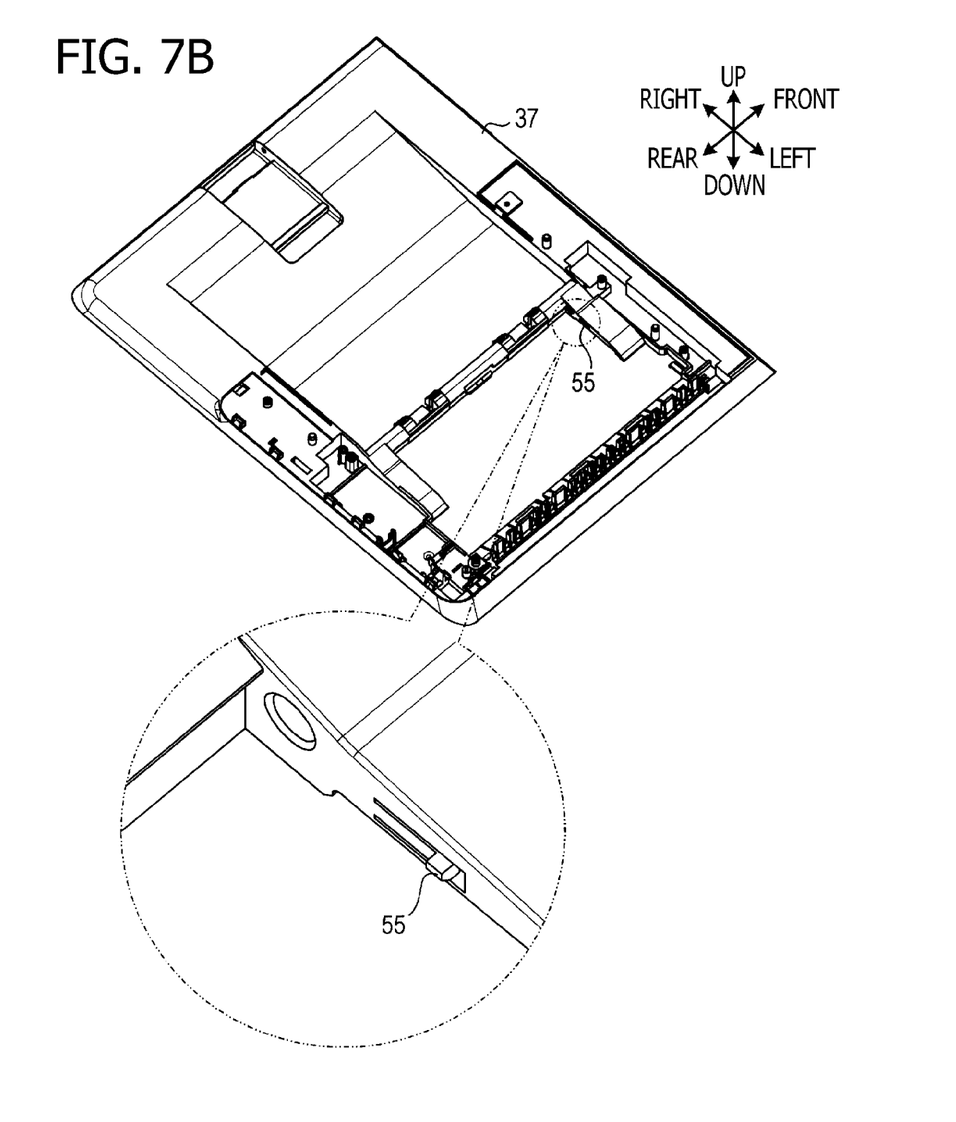
FIG. 7B is a perspective and partially enlarged view of a base member of the MFP according to the different example of the present invention.
Figure 8A:
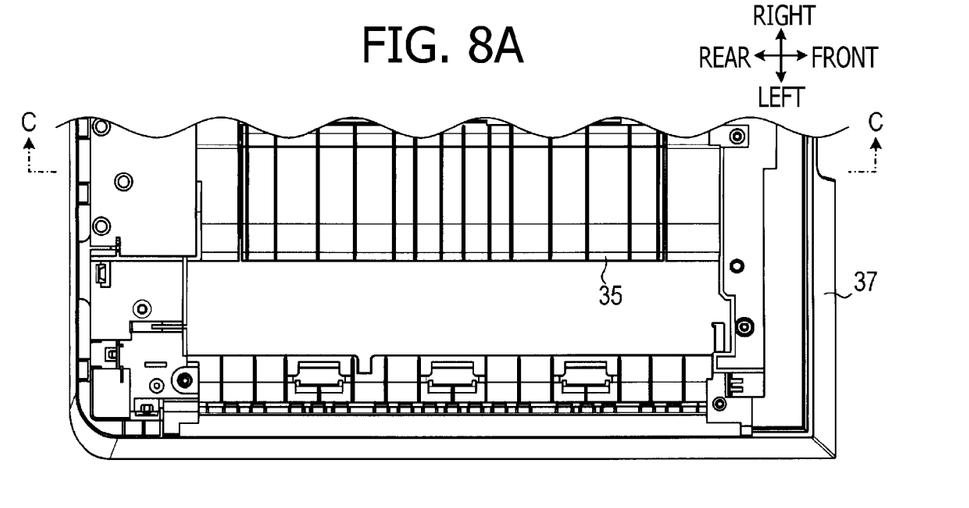
FIG. 8A is a plane partial view of the base member and the movable flip in the MFP according to the different example of the present invention.
Figure 8B:
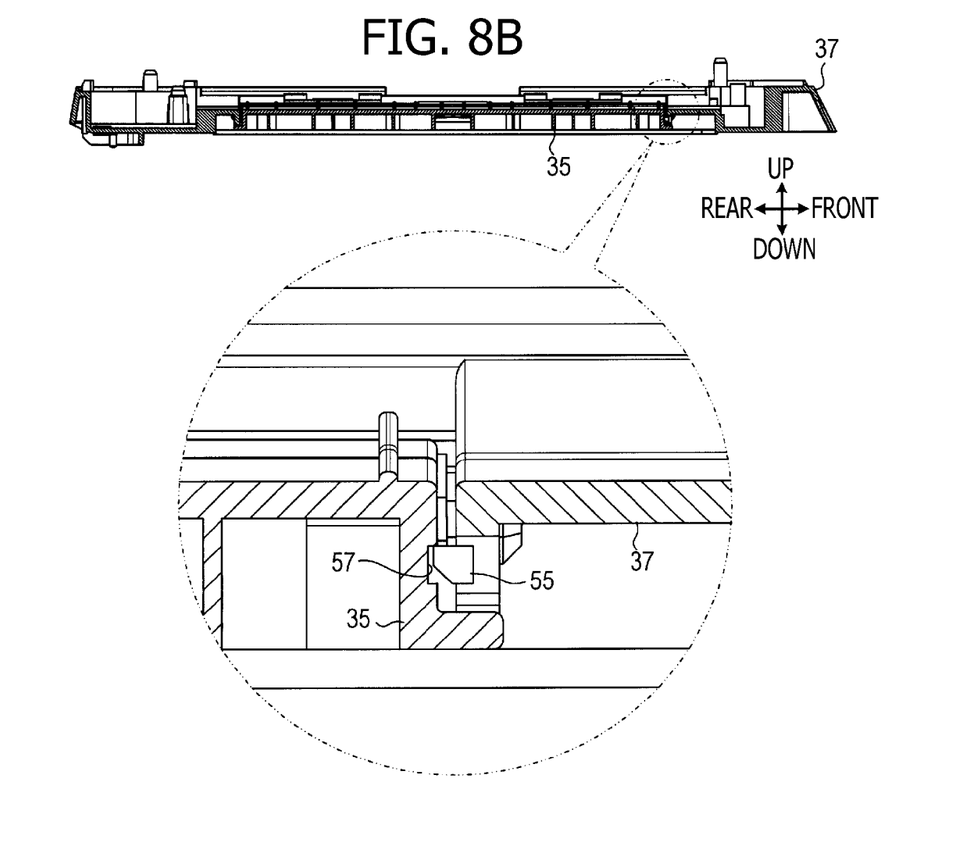
FIG. 8B is a cross-sectional side view and an enlarged view of the base member with an engageable piece and the movable flip with a recess taken from a line C-C shown in FIG. 8A.

Alternatively, the presser member 13, 50 may be configured to hold the movable flip 35 at the open position. For example, the base member 37 may be formed to have an engageable piece 55 (see FIG. 7B), which is resiliently deformable in the direction of depth (the front-rear direction). Further, the movable flip 35 may be formed to have a recess 57 (see FIGS. 8A and 8B) to accept the engageable piece 55. With engagement of the engageable piece 55 with the recess 57, the movable flip 35 may be held steadily at the closed position against its own weight even when the ADF 7 is uplifted. In this configuration, the movable flip 35 should be released from the engageable piece 55 when the user attempts to displace the movable flip 35 from the closed position by hand. More specifically, when the movable flip 35 is moved downwardly by the user, an edge of the movable flip 35 surrounding the recess 57 comes in contact with the engageable piece 55, and the engageable piece 55 is moved in the direction of depth (e.g., frontward in FIG. 7B) to yield to be away from the recess 57 of the movable flip 35. Thus, the engagement of the engageable piece 55 and the recess 57 is cleared, and the movable flip 35 shifts to the open position by its own weight.

Alternatively or additionally, the engagement of an engageable piece similar to the engageable piece 55 and a recess similar the recess 57 may be provided in order to hold the movable flip 35 in the open position. When the engaging structure to hold the movable flip 35 in the open position is employed in addition to the engaging structure (i.e., the engageable piece 55 and the recess 57) to hold the movable flip 35 in the closed position, the movable flip 35 may be held steadily in the open position and in the closed position. When the engagement is cleared, the movable flip 35 may be arbitrarily placed in the closed position and in the open position.

In the embodiment described above, the upper-stream section in the sheet path with respect to the U-curved section is arranged in the upper level in the ADF 7 whilst the lower-stream section in the sheet path with respect to the U-curved section is arranged in the lower level in the ADF 7. However, the direction of conveying the document sheet may be reversed. That is, the document sheet may be conveyed from the lower-level path toward the upper-level path via the U-curved section. In this configuration, the upper-stream section is arranged in the lower-level section in the ADF 7, and the lower-stream section is arranged in the upper-level section in the ADF 7. Even to the ADF in the reversed configuration, the present invention may be similarly effectively applied.

For another example, the presser member 13 and the movable flip 35 may not necessarily arranged in the positions to vertically overlap each other but may be arranged in vertically different positions from each other. Even in the vertically different positions, the mobility of the movable flip 35 may allow the user to access the lower-level path to remove the jammed sheet.

For another example, the scanner unit 3 to read the image from the document sheet may not necessarily be included in the MFP 1 but may be configured to be an independent scanning device with the single scanning function.

What is claimed is:

1. An image reading apparatus to read an image formed on a sheet, comprising:
   a main unit having a flat surface, on which the sheet with the image to be read can be placed, and an image reader, which is configured to be moved along the flat surface to read the image from the sheet; and
   an openable unit, which is configured to be movable between an open position and a closed position with respect to the main unit and cover the flat surface when in the closed position,
   wherein the openable unit includes a sheet tray, in which the sheet with the image to be read can be set, a conveyer section, which is configured to convey the sheet from the sheet tray along a sheet path, and a discharge section, in which the sheet having been conveyed by the conveyer section is discharged;
   wherein the image reader is configured to read the image formed on the sheet being conveyed by the conveyer section in a predetermined reading position;
   wherein the sheet path includes a U-curved section, along which the sheet being conveyed is turned around, an upper-level path, which is in an upper position within the sheet path, and a lower-level path, which is in a lower position with respect to the upper-level path within the sheet path;
   wherein the conveyer section comprises the U-curved section in the sheet path;
   wherein the sheet path further includes an upper-stream section, which ranges from the sheet tray to the U-curved section, and a lower-stream section, which ranges from the U-curved section to the discharge section;
   wherein one of the upper-stream section and the lower-stream section is provided as the upper-level path, and the other of the upper-stream section and the lower-stream section is provided as the lower-level path;
   wherein the image formed on the sheet is read by the image reader in the predetermined reading position whilst the sheet being conveyed in the lower level path passes through a position to face the image reader;

wherein the openable unit is provided with a movable piece, which is arranged in a position along the lower-level path and is swingable about a first edge thereof being an edge further from the U-curved section of the sheet path to swing a second edge thereof being an edge closer to the U-curved section to be close to and separated apart from the lower-level path;

wherein the movable piece is movable by its own weight from a closed position, in which the second edge of the movable piece is closest to the lower-level path, to an open position in which the second edge of the movable piece is furthest from the lower-level path, when the openable unit is moved to the open position; and wherein the movable piece serves as a part of a bottom surface of the lower-level path when in the closed position and exposes a part of the lower-level path when in the open position.

2. The image reading apparatus according to claim 1, wherein the movable piece is capable of being held steadily in the closed position and movable from the closed position to the open position when the openable unit is opened and an opening force from a user is applied thereto.

3. The image reading apparatus according to claim 1, wherein the movable piece is moved from the open position to the closed position by the second edge being pressed against the flat surface when the openable unit becomes closed with respect to the main unit.

4. The image reading apparatus according to claim 1, wherein the movable piece moved to the open position is restricted from being moved further from the open position by a part of the movable piece, which comes in contact with the openable unit when the movable piece is in the open position.

5. The image reading apparatus according to claim 1, further comprising:

a presser member, which is configured to press the sheet placed on the flat surface, in a position to face the flat surface when the openable unit is in the closed position;

wherein the movable piece is arranged in an upper position with respect to the presser member and movable to the open position along with a part of the presser member.

6. The image reading apparatus according to claim 5, wherein the presser member is fixed to the openable unit at a part, which is in a further position from the second edge of the movable piece with respect to a portion of the presser member coincident with the first edge of the movable piece.

7. The image reading apparatus according to claim 6, wherein the presser member includes a plurality of laminated layers, which includes a resiliently-deformable layer and a film layer;

wherein the resiliently-deformable layer is resiliently deformable to be compressed by the openable unit and the flat surface via the film layer when the openable unit is in the closed position;

wherein the film layer is interposed between the resiliently-deformable layer and the flat surface when the openable unit is in the closed position;

wherein the resiliently-deformable layer is divided into a plurality of pieces including a first section and a second section at least at a position, which is further from the second edge of the movable piece with respect to a portion of the presser member coincident with the first edge of the movable piece, the first section being closer to the second edge of the movable piece with respect to divided position, and the second section being further from the second edge of the movable piece with respect to the divided position; and wherein the presser member is fixed to the movable piece at the second section.

* * * * *